United States Patent Office 3,054,824
Patented Sept. 18, 1962

3,054,824
N,N′-DIARALKYLSALICYLIDENE DIAMINO-ALKANES AND USES THEREOF
Joseph T. Arrigo, Broadview, Ill., assignor, by mesne assignments, to Universal Oil Products Company, Des Plaines, Ill., a corporation of Delaware
No Drawing. Filed Mar. 17, 1958, Ser. No. 721,695
3 Claims. (Cl. 260—566)

This invention relates to a novel metal deactivator and to the use thereof in the stabilization of organic substances against deterioration by oxygen catalyzed in the presence of, or by contact with, certain metallic oxidation promoters.

The novel metal deactivator of the present invention is employed to deactivate the catalytic effect of metals in any substrate containing such metals. Thus, the metal deactivator composition is used to prevent such deterioration of motor fuels, fats, edible oils, lubricating oils, diesel oils, fuel oils, etc. The present invention is particularly applicable to the stabilization of olefin-containing motor fuels such as cracked and/or polymer gasoline, or mixtures of these with straight run, natural and/or other saturated gasolines.

One method of refining gasoline is the copper sweetening process, in which process the gasoline is treated with a copper-containing reagent. As a result of this treatment, the sweetened gasoline usually contains relatively small amounts of copper compounds which catalyze oxidation reactions. In addition, gasolines come in contact with various metals in the course of refining, storing and shipping operations, and the metals may catalyze the oxidation reactions. In some cases, this also may result in the gasoline containing minor amounts of such metals as copper, iron, cobalt, nickel, chromium, lead, etc., which have a detrimental effect on the stability of the gasoline. In addition to gasoline, the other organic compounds hereinbefore set forth also become contaminated with metallic constituents during the course of refining, storing and shipping operations and, accordingly, are deleteriously affected by the metallic constituents.

One important objection to the metal deactivators presently in use is that the active constituent precipitates out of solution at the low temperatures normally encountered in winter months. This is a serious drawback to the satisfactory use of these metal deactivators because solidification in the drum or other container necessitates heating and additional handling in order that the metal deactivator may be pumped for incorporating into the substrate. Also, precipitation of the active constituent out of solution in the substrate means that the metal deactivator is not functioning for the desired purpose and also interferes with pumping of the substrate due to plugging of the lines, pumps, etc.

The present invention provides a novel metal deactivator which will remain in solution at considerably lower temperatures and will not cause the difficulties mentioned above during use at the low temperatures encountered in the winter months. The novel metal deactivator also possesses high potency in preventing oxidation caused by metallic constituents in the substrate and also possesses greater solubility in organic substrates.

In one embodiment the present invention relates to a method of stabilizing an organic substance against oxidation catalyed by a metal constituent, which comprises incorporating in said organic substance a metal deactivator comprising an N,N′-di-aralkylsalicylidene diaminoalkane.

In a specific embodiment the present invention relates to a method of stabilizing gasoline against oxidation catalyzed by a metal constituent, which comprises incorporating in said gasoline N,N′-di-benzylsalicylidene-1,2-diaminopropane.

In another embodiment the present invention relates to an organic substance containing a metal which normally catalyzes oxidative deterioration and additionally containing the metal deactivator as herein defined.

The metal deactivators of the present invention are new compositions of matter and, accordingly, are being so claimed in the present application.

The novel metal deactivator of the present invention comprises an N,N′-di-aralkylsalicylidene diaminoalkane. A preferred metal deactivator comprises N,N′-di-benzylsalicylidene-1,2-diaminopropane which is prepared by the condensation of 2 moles of benzylsalicylaldehyde with 1 mole of 1,2-diaminopropane. Other metal deactivators include N,N-di-phenylethylsalicylidene-1,2-diaminopropane,
N,N′-di-phenylpropylsalicylidene-1,2-diaminopropane,
N,N′-di-phenylbutylsalicylidene-1,2-diaminopropane,
N,N′-di-phenylpentylsalicylidene-1,2-diaminopropane,
N,N′-di-phenylhexylsalicylidene-1,2-diaminopropane,
N,N′-di-phenylheptylsalicylidene-1,2-diaminopropane,
N,N′-di-phenyloctylsalicylidene-1,2-diaminopropane,
N,N′-di-phenylnonylsalicylidene-1,2-diaminopropane,
N,N′-di-phenyldecylsalicylidene-1,2-diaminopropane,
N,N′-di-phenylundecylsalicylidene-1,2-diaminopropane,
N,N′-di-phenyldodecylsalicylidene-1,2-diaminopropane,
  etc.

In general preferred compounds comprise those in which the aralkyl group is joined through the alpha carbon atom thereof to the salicylidene ring.

While 1,2-diaminopropane preferably is used for condensation with the aralkylsalicylaldehyde compound in preparing the metal deactivator, other suitable diaminoalkanes may be employed. Illustrative diaminoalkanes include 1,2-diaminoethane, 1,3-diaminopropane, 1,2-diaminobutane, 1,3-diaminobutane, 1,4-diaminobutane, 1,2-diaminopentane, 1,3-diaminopentane, 1,4-diaminopentane, 1,2-diaminohexane, 1,3-diaminohexane, 1,4-diaminohexane, etc. When using these diaminoalkanes the metal deactivator compound will be similar to the specific compounds hereinbefore set forth except for the diaminoalkane grouping. For example, when condensing 1,2-diaminoethane with benzylsalicylaldehyde the metal deactivator will be N,N-di-benzylsalicylidene-1,2-diaminoethane. Similarly, when condensing 1,2-diaminobutane with benzylsalicylaldehyde the metal deactivator will be N,N′-di-benzylsalicylidene-1,2-diaminobutane, etc.

The exact position of the aralkyl substitution on the salicylaldehyde ring will depend upon the specific aralkylsalicylaldehyde used in the condensation. This in turn depends upon the particular method of preparing the aralkylsalicylaldehyde and, in many cases, a mixture of isomers is obtained. As another advantage to the present invention the mixture of isomers may be used in the condensation with the diaminoalkane, and the resultant mixture of aralkylsalicylidene diaminoalkanes may be used as a metal deactivator without the necessity or expense of separating individual compounds. For example, a mixture containing 2 or more of 3-benzylsalicylaldehyde, 4-benzylsalicylaldehyde and 5-benzylsalicylaldehyde is condensed with 1,2-diaminopropane to yield a metal deactivator containing 2 or more of N,N′-di-(3-benzylsalicylidene)-1,2-diaminopropane, N,N′-di-(4-benzylsalicylidene)-1,2-diaminopropane and N,N′-di-(5-benzylsalicylidene)-1,2-diaminopropane. It is understood that, when desired, the individual compounds may be separated by any suitable manner and used as a metal deactivator. However, as hereinbefore set forth, this separation is not necessary because the mixture functions very effectively as a metal deactivator.

In some cases, the aralkylsalicylaldehyde which is condensed with the diaminoalkane may contain other substituents, and may be illustrated by the following general structure:

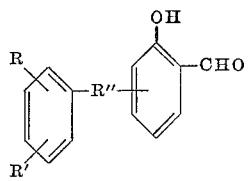

where R and R' are selected from the group consisting of hydrogen, alkyl, aryl, alkaryl, aralkyl, alkoxyl, chloro, bromo, iodo, fluoro and hydrocarbon substituents containing non-hydrocarbon radicals selected from halogen, oxygen, nitrogen, sulfur, phosphorus, etc., and R'' is an alkylene group, preferably methylene, which may have attached thereto substituents as defined for R or R'.

It will be noted that a number of different metal deactivator compounds may be prepared and used in accordance with the present invention. It is understood that all these compounds are not necessarily equivalent in the same or different substrates, but all of them are effective metal deactivators and will remain in liquid condition at low temperatures. The metal deactivator of the present invention contains an aralkyl substitution attached to the salicylal ring, and it is believed that this substitution in association with the remaining constituents of the metal deactivator produces the improved result.

The metal deactivator may be prepared in any suitable manner. As hereinbefore set forth, a preferred deactivator is prepared by the condensation of 2 moles of benzylsalicylaldehyde with 1 mole of 1,2-diaminopropane. The condensation is effected readily by admixing the required concentrations of benzylsalicylaldehyde or other aralkylsalicylaldehyde and the diaminoalkane, and refluxing the mixture. The reaction generally is effected in the presence of an organic solvent. Any suitable solvent or mixtures thereof may be employed and may be selected from benzene, toluene, xylene, cumene, decalin, etc., alcohols such as methanol, ethanol, propanol, butanol, etc., ethers such as diethyl ether, diisopropyl ether, etc. Following the reaction, water, solvent and any unreacted constituents are removed in any suitable manner as, for example, by distilling at a temperature of from about 200° F. to about 350° F., preferably under vacuum in order to avoid decomposition of the reaction product. In another method, the condensation may be effected in a zone provided with a water outlet so that the water formed during the reaction is continuously removed from the reaction zone. The solvent later is removed in either the same or different zone.

From the above description it will be noted that the metal deactivator is prepared by the condensation of 2 moles of aralkylsalicylaldehyde with 1 mole of diaminoalkane. This condensation involves the liberation of 2 moles of water per mole of diaminoalkane and thus completion of the reaction is readily determined by measuring the water liberated in the reaction.

As hereinbefore set forth, an important advantage to the novel metal deactivator of the present invention is that it remains in solution at very low temperatures, in addition to the facts that it is a very effective metal deactivator and is of greater solubility. However, in most cases, the low temperatures encountered in the normal use of the metal deactivator are somewhat higher so that such a low freezing point is not required. Therefore, in another embodiment of the present invention, the metal deactivator herein set forth may be utilized in admixture with other metal deactivators having a higher freezing point. The mixed composition will have a lower freezing point than the added metal deactivator alone, and the freezing point of the mixture may be sufficiently low to satisfy normal requirements. While the different metal deactivator compounds may be separately prepared and subsequently mixed, a preferred method of this embodiment is to simultaneously condense the benzylsalicylaldehyde and salicylaldehyde, ortho vanillin and/or other suitable aromatic aldehydes with the diaminoalkane in proportions of 2 moles of total aromatic aldehyde per 1 mole of diaminoalkane. In this embodiment the benzylsalicylaldehyde comprises from about 20 to about 90 mole percent of the total aromatic aldehyde used in the condensation. It will be seen that this condensation forms a mixture of different compounds. For example, when simultaneously condensing benzylsalicylaldehyde and salicylaldehyde, the products include N,N'-di-benzylsalicylidene diaminoalkane, N,N'-salicylidene diaminoalkane and N-benzylsalicylidene-N'-salicylidene diaminoalkane. As hereinbefore set forth, this mixture has a lower freezing point than the corresponding disalicylidene diaminoalkane and will remain in solution at the lower temperatures normally encountered during the use of the metal deactivator.

For ease in handling and in use, the metal deactivator normally is prepared as a solution in a suitable solvent. Preferred solvents include benzene, toluene, xylene, cumene, decalin, etc., as well as alcohols, ethers, etc. For economical reasons it is desirable to form as concentrated a solution of the active component of the metal deactivator as possible and, as hereinbefore set forth, the lower freezing point active component of the present invention permits the preparation and use of more concentrated solutions than otherwise is obtainable with other metal deactivators.

The metal deactivator normally is utilized along with other additives to be incorporated in the substrate for various reasons. For example, when used in gasoline, an antioxidant also is employed. In some cases the antioxidant is prepared as a solution in a suitable solvent and, when desired, the metal deactivator of the present invention may be commingled with the antioxidant and marketed as a mixed solution. Commercial gasoline antioxidants include N,N'-di-sec-butyl-p-phenylene diamine, N-n-butyl-p-aminophenol, 2,6-di-tert-butyl-4-methylphenol, etc. Similarly, when utilized in fatty materials, the metal deactivator may be prepared as a mixed solution with antioxidant or other additive to be incorporated in the fatty material. Commercial antioxidants for fatty materials include butylated hydroxyanisole, 2,6-di-tert-butyl-4-methylphenol, etc., and generally are used along with other materials including propyl gallate, citric acid, etc.

The metal deactivator is used in a small but sufficient concentration to prevent oxidation catalyzed by metal constituents. In general, the metal deactivator is used in a concentration of from about 0.0001% to about 0.5% by weight (based on active constituent) of the substrate. The antioxidant may be employed in a concentration of from about 0.0005% to about 1% by weight of the substrate.

The metal deactivator is incorporated in the substrate in any suitable manner and, as hereinbefore set forth, the metal deactivator remains fluid at low temperatures and therefore is readily pumped for incorporating in the substrate. Intimate mixing of the metal deactivator in the substrate is accomplished in any suitable manner as, for example, pumping through orifice mixers, mixing in a tank equipped with stirrers, etc.

The following examples are introduced to illustrtae further the novelty and utility of the present invention but not with the intention of unduly limiting the same.

*Example 1*

The metal deactivator of this example was prepared by the condensation of 2 mole proportions of benzylsalicylaldehyde and 1 mole proportion of 1,2-diaminopropane. The benzylsalicylaldehyde was synthesized by the reaction of benzylchloride with salicylaldehyde according to the procedure described in the literature, Compt. rend., 242, 1331 (1956). The benzylsalicylaldehyde was recovered in 31% yield and had a boiling point of 160° C. at 2.6 mm. and an index of refraction $n_D^{20}$ of 1.6104. Infrared spectral analysis indicated that the product was a mixture of isomeric benzylsalicylaldehydes.

25 grams (0.118 mole) of benzylsalicylaldehyde prepared in the above manner was admixed with 4.36 grams (0.059 mole) of 1,2-diaminopropane in benzene solvent. The mixture was refluxed in a reaction zone equipped with a water leg which permitted the continuous removal of water formed during the reaction. The refluxing was continued until the theoretical amount of water was eliminated, following which the benzene was removed by distillation under vacuum. The residue is N,N′-dibenzylsalicylidene-1,2-diaminopropane and is a red-brown, viscous liquid having a refractive index $n_D^{20}$ of 1.633, molecular weight (cryoscopically) of about 436. The calculated molecular weight is 462. The calculated elemental analysis for $C_{31}H_{30}N_2O_2$ are 80.50 C, 6.53 H, 6.05 N and 6.92 O. Actually found by analysis are 80.58 C, 6.43 H and 6.01 N. Proof of the structure was further confirmed both by ultraviolet and infrared spectral analyses.

*Example II*

The metal deactivator prepared in accordance with Example I was evaluated in a blended commercial gasoline which had a normal induction period of 90 minutes. Upon the addition of 0.003% by weight of N,N′-di-sec-butyl-p-phenylene diamine antioxidant, the induction period of the gasoline was increased to 525 minutes. However, upon the addition of 1 mg. of copper per liter to another sample of the gasoline containing the antioxidant, the induction period fell to about 90 minutes. The metal deactivator prepared as in Example I was incorporated, in a concentration of 0.0015% by weight (1.5 times the stoichiometric concentration required to chelate the copper), in another sample of the gasoline containing both the copper and the antioxidant, and the induction period of the gasoline was increased to 515 minutes. It will be noted that the metal deactivator of the present invention served to offset the deleterious effect of the copper.

*Example III*

The metal deactivator of this example is prepared by the condensation of 2 moles of phenylethylsalicylaldehyde and 1 mole of 1,2-diaminobutane. The condensation is effected substantially in the same manner as described in Example I, the product being refluxed in the presence of benzene solvent until the theoretical amount of water is liberated, following which the benzene solvent is removed by distillation under vacuum. The product is N,N′-phenylethylsalicylidene-1,2-diaminobutane and is recovered as a viscous liquid.

*Example IV*

As hereinbefore set forth, the metal deactivator of the present invention will not solidify at low temperatures. A series of solutions of the metal deactivator of Example I is prepared in 50, 66.7 and 80% by weight concentrations in toluene and also in xylene. All the solutions, upon cooling to about 3–4° F., remain homogeneous without signs of hazing or precipitation of solids. In contrast to the above, a metal deactivator prepared by the condensation of 2 moles of salicylaldehyde with 1 mole of 1,2-diaminopropane, when prepared as a solution containing 50% and 66.7% by weight in xylene, precipitated out of solution when cooled to 3–4° F.

*Example V*

The metal deactivator of Example I is used in a lard having a normal stability period of 4 hours as determined by the Active Oxidation Method. This method is a standard test for determining the stability of lard. In general, this test comprises bubbling air through a sample of the lard and periodically determining the peroxide number. The results are reported as the number of hours required to reach a peroxide number of 20.

In order to determine the effect of metal, a 3″ strip of 18 gauge copper wire is added to a sample of the lard. This reduces the stability of the lard from 4 hours to 1 hour. However, upon the addition of 0.01% by weight of the metal deactivator of Example I, the stability of the lard is increased to the original value of 4 hours.

Similarly, the addition of 0.02% by weight of butylated hydroxyanisole antioxidant to another sample of the lard not containing copper increases the stability period of the lard to about 33 hours. However, upon the addition of copper to the lard containing butylated hydroxyanisole, the stability period drops to 2 hours. The metal deactivator of the present invention, when incorporated in a sample of the lard containing copper and antioxidant, serves to increase the stability period of the lard.

*Example VI*

As hereinbefore set forth, an improved metal deactivator composition also is prepared by the simultaneous condensation of an aralkylsalicylaldehyde and salicylaldehyde with a diaminoalkane. As an example of this embodiment, 1.5 moles of benzylsalicylaldehyde and 0.5 mole of salicylaldehyde are condensed with 1 mole of 1,2-diaminopropane in substantially the same manner as described in Example I. The product is a viscous liquid and is utilized as a metal deactivator to offset the catalytic effect of metals to oxidize kerosene.

I claim as my invention:

1. N,N′-di-benzylsalicylidene and diaminoalkane containing from 2 to 6 carbon atoms in said alkane radical.

2. N,N′ - di - benzylsalicylidene - 1,2 - diaminoalkane containing from 2 to 6 carbon atoms in said alkane radical.

3. N,N′ - di - benzylsalicylidene - 1,2 - diaminopropane.

References Cited in the file of this patent

UNITED STATES PATENTS

| | | |
|---|---|---|
| 2,255,597 | Downing et al. | Sept. 9, 1941 |
| 2,346,663 | Chenicek | Apr. 18, 1944 |
| 2,416,042 | Brooks | Feb. 18, 1947 |
| 2,455,193 | Rohrmann | Nov. 30, 1948 |
| 2,533,205 | Chenicek | Dec. 12, 1950 |
| 2,582,867 | Hartough et al. | Jan. 15, 1952 |
| 2,687,962 | Chenicek | Aug. 31, 1954 |
| 2,789,912 | Gleim | Apr. 23, 1957 |
| 2,813,080 | Bartlett | Nov. 12, 1957 |

OTHER REFERENCES

Bailes et al.: "J.A.C.S.", volume 69, pages 1886–1893 (1947).